United States Patent [19]

Yoshikawa et al.

[11] 4,192,773

[45] Mar. 11, 1980

[54] OXYGEN ABSORBENT

[75] Inventors: Yoshio Yoshikawa, Ushiku; Takanari Nawata, Tokyo; Akira Amemiya, Tokyo; Toshio Komatsu, Tokyo; Yoshiaki Inoue, Tokyo; Megumu Yuyama, Tokyo, all of Japan

[73] Assignee: Mitsubishi Gas Chemical Company, Inc., Tokyo, Japan

[21] Appl. No.: 934,489

[22] Filed: Aug. 17, 1978

[30] Foreign Application Priority Data

Aug. 24, 1977 [JP] Japan .................. 52/101452

[51] Int. Cl.$^2$ .................. B01J 31/26; B01J 27/08
[52] U.S. Cl. .................. 252/429 R; 206/205;
252/188; 252/437; 252/439; 252/440; 252/441;
423/219; 426/118; 426/124; 426/395; 426/398
[58] Field of Search ........... 252/429 R, 441, 437,
252/439, 440, 188; 426/124, 118, 395, 398;
423/219; 206/205

[56] References Cited

U.S. PATENT DOCUMENTS

| | | |
|---|---|---|
| 4,102,803 | 7/1978 | Fujishima et al. .................. 252/188 |
| 4,104,192 | 8/1978 | Yoshikawa et al. .................. 252/188 |
| 4,127,503 | 11/1978 | Yoshikawa et al. .................. 252/429 R |

FOREIGN PATENT DOCUMENTS 226512 5/1925 United Kingdom .................. 423/219

Primary Examiner—P. E. Konopka
Attorney, Agent, or Firm—Frishauf, Holtz, Goodman & Woodward

[57] ABSTRACT

An oxygen absorbent comprising (a) metal halide-coated metal powder having at least one metal halide coated on the surface of at least one metal powder, the amount of metal halide coated being in the range of from about 0.001 part to about 10 parts by weight per 100 parts by weight of the metal powder, and the water content of the metal halide-coated metal powder being less than 1% by weight on the basis of total weight of the metal halide-coated metal powder an (b) a water-containing material and a process for producing the same are disclosed.

23 Claims, No Drawings

OXYGEN ABSORBENT

This invention relates to an oxygen absorbent comprising a metal halide-coated metal powder and a water-containing material and also relates to a process for producing the same.

In order to preserve foodstuffs, such as vegetables, fish, shellfish, meats, processed foodstuffs, such as potato chips, cakes, peanuts, etc., and so on, it is necessary to prevent the foodstuffs from getting moldy and from putrefying. Prior art methods have used freezer storage, cold strage, vacuum packaging and replacing the gas present in the inner part of packaging by an inert gas for preventing foodstuffs from getting moldy and putrefying. Additives, such as antioxidant, have been used for preserving foodstuffs. Recently, governments have started to regulate the use of additives for food, since it is realized that some additives are injurious to humans. The freezer storage method requires large-scale apparatus and complicated operation, so the freezer storage method is costly.

Molds or eumycetes, bacterias and higher organisms such as insects tend to disturb preservation of foodstuffs. These mold eumycetes, bacterias and insects live and grow in the presence of oxygen and cause putrefaction and change in quality of foodstuffs.

Therefore, if oxygen can be selectively removed from the atmosphere in which the foodstuffs are packed, the problem of putrefaction and change in quality of foodstuff can be overcome, and it will become possible to preserve foodstuffs for a long time.

Attempts have been made for producing such an oxygen absorbent.

Japanese Pat. No. 19729/1972 discloses the use of an oxygen absorbent comprising hydrosulfite, calcium hydroxide, sodium bicarbonate, activated carbon and optionally water to preserve vegetables by removing oxygen from atmosphere.

U.S. Pat. No. 2,825,651 proposes a process for preparing an oxygen absorbent comprising mixing a finely divided sulfite and a finely divided metal salt, at least one of the two compounds having water of crystallization and compression-pelletizing the mixture in order to increase the rate of the oxidation of sulfite.

British Pat. No. 553,991 discloses the step of forming pellets comprising carbon and highly activated iron powder obtained by hydrogen treatment, followed by absorbing oxygen in a container using the resulting pellets. Since iron powder contained in the pellets is highly active, the iron intensely reacts with oxygen in the container to remove oxygen therein. There is the possibility of fire in case of using such highly active iron powder. The process of BP No. 553,991 is dangerous.

Five of the present inventors have carried out wide research to find an oxygen absorbent having no such danger while is safe to handle and effective. As a result, they found a highly flowable oxygen absorbent comprising a metal powder coated with a definite amount of a metal halide and having a minor amount of water and proposed the absorbent (refer to U.S. Ser. No. 816,134). When the oxygen absorbent is placed in a closed container with foodstuffs, it absorbs oxygen in the presence of water vapour evaporated from the foodstuffs. However, the absorbing ability of the oxygen absorbent depends upon the amount of water vapour evaporated from the foodstuffs. So, when the absorbent is used with foodstuffs from which little water vapor is generated, the oxygen-absorbing rate of the absorbent is slow.

SUMMARY OF THE INVENTION

The present inventors have carried out research to find oxygen absorbent to overcome such shortcoming.

Therefore, an object of this invention is to provide an oxygen absorbent overcoming the prior art disadvantages, namely, danger and low oxygen absorbing rate in the absence of water.

This invention relates to an oxygen absorbent comprising (a) a metal halide-coated metal powder having at least one metal halide coated on the surface of at least one metal powder, the amount of metal halide coated being in the range of from about 0.001 part to about 10 parts by weight per 100 parts by weight of the metal powder, and the water content of the metal halide-coated metal powder being less than 1% by weight on the basis of total weight of the metal halide-coated metal powder (sometimes hereinafter referred to as component (A)) and (b) a water-containing material (sometimes hereinafter component (B)). The absorbing ability of the present oxygen absorbent is independent of the amount of water vapour generated from the foodstuff. So, the oxygen-absorbing rate of the present oxygen absorbent is always rapid.

In general, it is preferred that an oxygen absorbent have the following properties:
(a) creating no danger from hydrogen-evolution,
(b) being high fluidity to being capable of being packed by automatic packaging machine,
(c) not losing the effectiveness of the oxygen absorbent during the preparation of the absorbent.

Component (A) alone does not exhibit oxygen absorbing ability. The present oxygen absorbent exhibits oxygen absorbing ability, only after component (A) contacts component (B). Therefore, component (A) must not contact component (B), before packing components (A) and (B) in a bag made of an air-permeable material.

As soon as components (A) and (B) are packed in the air-permeable bag, the bag must be packed in a gas-non-permeable bag. In general, many bags containing components (A) and (B) are packed in a gas-non-permeable bag. The gas-non-permeable bag is stored, shipped and sold. Alternatively, as soon as components (A) and (B) are packed in an air-permeable bag, the bag may be packed with foodstuffs to be stored for a long time.

This invention also relates to a process for producing an oxygen absorbent comprising component (A) and component (B), characterized packing component (A) and component (B) in an air-permeable bag so that component (A) does not contact component (B) before packing them.

DETAILED DESCRIPTION OF THE INVENTION

The term "oxygen absorbent" in the specification and the claim means an agent for removing or absorbing oxygen.

The metal powders which can be employed in the present invention may include copper powder, iron powder, zinc powder, and mixtures thereof; iron powder is preferred. Suitably the metal powder has size of less than 10 mesh, preferably 50 mesh. The metal powders may be electrolytic metal powders, reduced metal powders, atomized metal powders and stamped metal powders. Reduced iron powder, electrolytic iron powder and atomized iron powder are preferred. The metal does not need to have high purity. The metal may contain impurities, as long as the object of this invention can be achieved. The mesh screen employed was Tyler Standard Sieve mesh.

The metals constituting the metal halides may be metal selected from the group consisting of alkali metals, alkali earth metals, copper, zinc, aluminum, tin, manganese, iron, cobalt and nickel. In order to avoid the generation of hydrogen, alkali metals, such as lithium, sodium potassium and alkali earth metals, such as calcium, magnesium and barium are preferred. The halogen constituting the metal halide may be chlorine, bromine or iodine. Chlorine is preferred.

The amount of the metal halide to be coated on the surface of the metal powder is in the range of from about 0.001 part to about 10 parts by weight per 100 parts by weight of metal powder, and about 0.01 part to about 5 parts of the metal halide is preferred. When the amount of the metal halide coated is less than 0.001 part by weight, the absorbing ability of oxygen is lowered. When the amount of the metal halide coated is more than 10 parts by weight, much water is likely to migrate into the oxygen absorbent due to deliquescence of the metal halide. Therefore, the metal halide penetrates through the packaging material into foodstuffs and the evolution of hydrogen increases.

The metal powder coated with a metal halide and a binder and/or an alkaline material may be used as component (A) in order to improve its oxygen-absorbing ability and to prevent the evolution of hydrogen.

Suitably, the binders may include water soluble polymeric compounds, such as sodium alginate, carboxymethyl cellulose (CMC), hydroxymethyl cellulose, methyl cellulose, ethyl cellulose, propyl cellulose, sodium carboxymethyl cellulose, starch, polyhydric alcohols, polyvinyl alcohol (PVA), saccharides, tragacanth gum. The amount of the binder employed may be in the range of from about 0.01 part to 10 parts by weight per 100 parts by weight of the metal powder, and about 0.1 to about 2 parts by weight of the binder is preferably employed.

The alkaline materials may include hydroxides, carbonates, sulfites, thiosulfates, dibasic phosphates, tribasic phosphates, polyphosphates, or organic acid salts of alkali metals or alkaline earth metals. Sodium hydroxide, sodium carbonate, sodium sulfite, sodium thiosulfate, tribasic sodium phosphate, dibasic sodium phosphate, potassium hydroxide, potassium carbonate, potassium sulfite, tribasic potassium phosphate, dibasic potassium phosphate, calcium hydroxide, magnesium hydroxide, calcium carbonate, sodium citrate, sodium succinate, sodium propionate and sodium fumarate are preferred; and magnesium hydroxide and sodium thiosulfate are most preferred. The amount of the alkaline material employed may be in the range of from about 0.01 part to about 10 parts by weight, preferably from about 0.1 part to about 2 parts per 100 parts of the metal powder.

The term "water content" in the specification and the claims means content of free water, and excludes content of water of crystallization. Component (A) of this invention has less than 1% of free water on the basis of the total weight of component (A), preferably less than 0.5% by weight of water, and more preferably less than 0.2% by weight of water.

Component (A) of this invention is prepared in the following way:

The metal powder is mixed with a solution of the metal halide and optionally the binder and/or the alkaline material, thereby coating the metal halide and optionally the binder and/or the alkaline material on the surface of the metal powder; and the resulting coating is dried until the water content thereof amounts to less than 1% by weight based on the total weight of the absorbent.

The solution of the metal halide may be a conventional aqueous solution thereof. The metal halide may be dissolved in a mixture of water and another solvent. The halide concentration may be suitably selected from any concentration up to saturated concentration.

The metal powder is mixed with the solution of the metal halide until the halide is coated on the powder particle.

When the metal powder is coated with the metal halide as well as the binder and/or the alkaline material, the order of the coating is not critical. The metal powder may be coated with these materials simultaneously or successively. The mixing process and the coating process are not critical. Conveniently, the mixture of the metal powder and the solution of the metal halide and other component may be dried as it is, or after the mixture is filtered, the precipitate may be dried.

Preferably the metal powder is mixed with the solution of the metal halide and optionally the binder and/or the alkaline material containing a minor amount of water, and the resulting mixture is dried. The coating is dried until the water content amounts to less than 1%, preferably less than 0.5%, more preferably less than 0.2% and most preferably is substantially zero. When the water content is more than 1%, the resulting absorbent has poor fluidity, it is difficult to pack the absorbent, it penetrates through the packaging material and more hydrogen is evolved.

The drying process is not critical. For example, the coating may be dried at one atmospheric pressure, at a reduced pressure, or in or inert gas atmosphere. In order to shorten the drying time, the metal halide, and optionally the binder and/or the alkaline material are dissolved in the mixture of water and a hydrophilic solvent, such as an alcohol.

The water-containing material is one from which water vapor is evaporated or generated. In general, materials having water content of more than 1% by weight and equilibrium humidity of more than 30% are preferred. For example, water-containing materials include water-containing particulate materials, compounds having water of hydration and natural materials. Water-containing particulate is preferred from the view point of controlling the amount of water vapor evaporated from the water-containing material.

Water-containing particulate material means particulate material impregnated with water or water-containing humidity-controlling agent. The particulate materials include diatomaceous earth, perlite, zeolite, activated alumina, silicagel, activated carbon, activated clay, sand, pebble and mixtures thereof.

The term "particulate material" generally means material having particle size of 0.5 mm to 10 mm.

The humidity-controlling agents include water and an aqueous solution of certain materials having equilibrium humidity of more than 30%. The aqueous solution is the one in which a hydrophilic inorganic or organic compound is dissolved. Aqueous solutions of an inorganic compounds or salts are preferred. Examples of inorganic compounds include $NaCl$, $NaBr$, $CaCl_2$, $MgCl_2$, $KHSO_4$, $(NH_4)_2SO_4$, $Ca(NO_3)_2$, $Mg(NO_3)_2$, $K_2HPO_4$, $Na_2CO_3$, $K_2CO_3$ and the like. Chlorides of alkaline earth metals and alkali metals, such as NaCl, NaBr, $CaCl_2$ and $MgCl_2$, and phosphates, such as $K_2HPO_4$ are preferred. NaCl and $MgCl_2$ are more preferred. Saturated aqueous solution of NaCl or MgCl are preferred. Examples of organic compounds include polyvalent alcohols, such as glycerin and ethylene glycol, organic salts, such as sodium acetate and magnesium acetate; and oxalic acid. Aqueous solutions if different equilibrium humidity can be obtained by adjusting concentration of the compound.

A process for impregnating the particulate material with water or the aqueous solution is not critical. For example, a process for mixing the particulate material with water or the aqueous solution in such an amount that the flowability of particulate material does not become worse; and a process for immersing the particulate material in the aqueous solution or water, followed by removing the liquid from the surface of the material through filtration or centrifugal separation may be used. In order to improve the flowability of the water impregnated particulate material, the wet surface of the material may be dried with air or warm air or may be coated with finely divided filler. The finely divided fillers include gypsum, baked gypsum, activated carbon, calcium carbonate, magnesium hydroxide and the like having particle size of less than 100 mesh.

When the water-containing material obtained by impregnating particulate material with water, followed by coating the surface of the material with finely divided filler is used as component (B), an oxygen absorbent having good flowability and capable of being packed automatically can be obtained.

Examples of Compounds having water of hydration include inorganic compounds, such as oxides, hydroxides, sulfides, halides, sulfates, sulfites, thiosulfates, nitrates, borates, phosphates, hydrogenphosphates, pyrophosphates, hydrogenpyrophosphates, carbonates, hydrogencarbonates, silicate, metasilicate, chromates, iodates, bromates, trimolybdates and tungstates, ammonium salts of metals; organic compounds, such as organic acids and organic acid salts; complexes; and double salts having water of hydration in its crystal structure. Compound(s) having water of hydration with a desired equilibrium humidity can be obtained by combinating two or more compounds having water of hydration and/or by selecting the amount of the compounds.

Natural materials include rice and beans.

The ratio of component (A) to compound (B) is not critical. The ratio is determined from the view points of the oxygen-absorbing rate, the amount of oxygen absorbed and economy. In general, the ratio is preferably determined so that the oxygen absorbent contains more than 0.1 part by weight of water, more preferably from 1 to 100 parts by weight of water per 100 parts by weight of metal powder. It is understood that the oxygen absorbent may contain much water.

Even when the present oxygen absorbent is used with foodstuffs from which little water vapor is evaporated, the oxygen-absorbing rate of the absorbent is rapid.

When particulate material impregnated with a humidity-controlling agent in which a salt or a polyvalent alcohol is dissolved is used as component (B), the oxygen-absorbing rate of the resulting oxygen absorbent can be adjusted. When an oxygen absorbent having an equilibrium humidity near that of the foodstuffs is used, the amount of water migrated into the foodstuffs can be made small.

The oxygen absorbent made according to the present process loses little of its effectiveness without need for purging with nitrogen.

The present invention is further illustrated by the following Examples and Comparative Examples. However, this invention should not be limited by these examples and comparative examples. The percent and parts in the Examples are based on weight unless otherwise specified.

EXAMPLE 1

To 100 gr of Fe powder was added 2 ml of a 20% aqueous solution of NaCl. The resulting mixture was mixed thoroughly and dried at 40° C. under reduced pressure of 40 mm Hg until its water content was substantially to zero to obtain component (A). To 100 gr of gypsum powder was added 20 ml of water. The resulting mixture was mixed sufficiently to obtain component (B). Components (A) and (B) were mixed in a nitrogen atmosphere. 6 Gr of the mixture was placed in a perforated polyethylene film-laminated paper bag of 5 cm×5 cm in a nitrogen atmosphere. The bag was placed in a 1 liter sealed container. After 24 hours, the oxygen concentration in the container was 0.0%.

COMPARATIVE EXAMPLE 1

3 Gr of component (A) employed in Example 1 was placed in the bag employed in Example. The bag was placed in a 1 liter sealed container. After 24 hours, the oxygen concentration in the container was 20.89%. Component (A) did not absorb any oxygen at all.

EXAMPLE 2

To 100 gr of Fe powder was added 2 ml of a 20% aqueous solution of NaCl. The resulting mixture was mixed thoroughly and dried at 40° C. under reduced pressure of 40 mm Hg until its water content was substantially zero to obtain component (A). 100 Gr of natural zeolite having 1–3 mm particle size was immersed in water. The zeolite was removed from water and was treated with centrifugal separator to obtain zeolite with 32.3% of water. The water-containing zeolite is called component (B). 3 Gr of each components (A) and (B) was charged in a perforated polyethylene film-laminated paper bag of 5 cm×5 so that the two components did not contact before charging them. The bag was placed in a 1 liter sealed container. After 24 hours, the oxygen concentration in the container was 0.0%.

EXAMPLE 3

To 100 gr Fe powder was added 20 ml of a 20% aqueous solution of $MgCl_2$. The resulting mixture was mixed and dried at 80° C. at reduced pressure of 20 mm Hg to obtain component (A). 100 Gr of particulate activated carbon with 0.5–2 mm size was mixed with 20 ml of water to allow the carbon to absorb the water. 10 Gr of gypsum was mixed with the water-containing activated carbon to coat the surface of the carbon with gypsum. The resulting gypsum-coated carbon is called component (B). 3 Gr of each of components (A) and (B) was charged in a perforated polyethylene film-laminated paper bag of 5 cm×5 cm so that the two components did not contact before charging them. The bag was placed in a 1 liter sealed container. After 24 hours, the oxygen concentration in the container was 0.0%.

EXAMPLE 4

100 Gr of powdery pulp was impregnated with 20 ml of water. The mixture was mixed sufficiently. 1 Gr of finely divided silica was mixed with the mixture to obtain water-containing powder with very good flowability. The powder is called component (B). 3 Gr of each of the component (B) and the component (A) employed in Example 2 was charged in a perforated polyethylene film-laminated paper bag of 5 cm×5 cm so that the two components did not contact before charging them. The bag was placed in a 1 liter sealed container. After 24 hours, the oxygen concentration in the container was 0.0%.

EXAMPLE 5

100 Gr of $Na_2SO_4.10H_2O$ in particulate state was mixed with 20 gr of $Mg(OH)_2$. The mixture was mixed sufficiently to obtain particles with high fluidity in which $Mg(OH)_2$ was coated on $Na_2SO_4.10H_2O$ particles. The powder is called component (B). 3 Gr each of the component (B) and the component (A) employed in Example 2 was charged in a perforated polyethylene film-laminated paper bag of 5 cm×5 cm so that the two components did not contact before charging them. The bag was placed in a 1 liter sealed container. After 24 hours, the oxygen concentration in the container was 0.0%.

EXAMPLE 6

Unhulled rice particles with moisture content of 14% were employed as component (B). 2 Gr each of the component (B) and the component (A) employed in Example 3 was charged in a perforated polyethylene film-laminated paper bag of 5 cm×5 cm so that the two components did not contact before charging them. The bag was placed in a 500 ml sealed container. After 24 hours, the oxygen concentration in the container was 1.2%, and after 48 hours, the oxygen concentration in the container was 0.0%.

EXAMPLE 7

100 Gr of natural zeolite having 1-3 mm particle size was mixed with 40 gr of a saturated aqueous solution of NaCl, 20 gr of $Mg(OH)_2$ to coat the magnesium hydroxide on the surface of the mixture. The resulting particles were allowed to stand in a sealed container to measure the equilibrium humidity thereof. The humidity was 78%. 2 Gr each of the particles and the component (A) employed in Example 2 were charged in a perforated polyethylene film-laminated paper bag so that the particles and the component (A) did not contact before charging them. The bag and sponge cake having water content activity of 0.78 were placed in a sealed container and allowed to stand therein. After 24 hours, the oxygen concentration in the container was 0.0%. After 30 days, the water content in the sponge cake did not change, no mold was observed on the cake, and quality of the cake was good. When the sponge cake alone was placed in the sealed container as a control test, after 10 days, growth of mold on the cake was observed.

EXAMPLE 8

100 Gr of natural zeolite having 1-3 mm particle size was mixed with 40 gr of a 80% glycerin aqueous solution. 20 Gr of gypsum was added to the mixture to coat the gypsum on the mixture. The resulting mixture was left standing in a sealed container to measure its equilibrium humidity. The humidity was 50%. 2 Gr each of the mixture and the component (A) employed in Example 3 was charged in a perforated polyethylene film-laminated paper bag so that the mixture and the component (A) did not contact before charging them. The bag and dried mushroom having water content activity of 0.50 were placed in a sealed container and were left standing. After 90 days, the amount of oxygen in the container was 0.0%. The water content of the mushroom did not change; and its original color and its quality were kept good. When the dried mushroom alone was left to stand under the same conditions as a control test, after 90 days, the color of the mushroom was changed to yellow.

What is claimed is:

1. An oxygen absorbent comprising (a) metal halide-coated metal powder having at least one metal halide coated on the surface of at least one metal powder, the amount of metal halide coated being in the range of from about 0.001 part to about 10 parts by weight per 100 parts by weight of the metal powder, and the water content of the metal halide-coated metal powder being less than 1% by weight on the basis of total weight of the metal halide-coated metal powder, and (b) a water-containing particulate material having a water content of more than 1% by weight obtained by impregnating the particulate material with a water-containing humidity controlling agent.

2. The oxygen absorbent as defined in claim 1 wherein the particulate material has particle size of 0.5 mm to 10 mm.

3. The oxygen absorbent as defined in claim 1 wherein the particulate material is selected from the group consisting of diatomaceous earth, perlite, zeolite, activated alumina, silicagel, activated carbon, activated clay, sand, pebble and mixtures thereof, and has particle size of 0.5 mm to 10 mm.

4. The oxygen absorbent as defined in claim 1 wherein the water-containing humidity controlling agent is an aqueous solution having an equilibrium humidity of more than 30%.

5. The oxygen absorbent as defined in claim 1 wherein the water-containing humidity controlling agent is an aqueous solution of a hydrophilic organic compound having an equilibrium humidity of more than 30%.

6. The oxygen absorbent as defined in claim 5 wherein the hydrophilic organic compound is selected from the group consisting of glycerin, ethylene glycol, sodium acetate, magnesium acetate, oxalic acid and mixtures thereof.

7. The oxygen absorbent as defined in claim 1 wherein the water-containing humidity controlling agent is an aqueous solution of an inorganic compound having an equilibrium humidity of more than 30%.

8. The oxygen absorbent as defined in claim 7 wherein the inorganic compound is an alkali metal or alkaline earth metal halide.

9. The oxygen absorbent as defined in claim 7 wherein the inorganic compound is selected from the group consisting of NaCl and $MgCl_2$.

10. The oxygen absorbent as defined in claim 1 wherein the water-containing controlling agent is a saturated aqueous solution of NaCl or $MgCl_2$.

11. The oxygen absorbent as defined in claim 1 wherein the water-containing particulate material is one obtained by impregnating the particulate material with water, followed by coating a finely divided filler on the particulate material.

12. The oxygen absorbent as defined in claim 11 wherein the finely divided filler is selected from the group consisting of gypsum, baked gypsum, activated carbon, calcium carbonate, magnesium hydroxide and mixtures thereof and has particle size of less than 100 mesh.

13. A process for producing an oxygen absorbent which comprises packing (a) metal halide-coated metal powder having at least one metal halide coated on the surface of at least one metal powder, the amount of metal halide coated being in the range of from about 0.001 part to about 10 parts by weight per 100 parts by weight of the metal powder, and the water content of the metal halide-coated metal powder being less than 1% by weight on the basis of total weight of the metal halide-coated metal powder, and (b) a water-containing material in an air-permeable bag so that the metal halide-coated metal powder does not contact the water-containing material before packing them, said water-containing material being water-containing particulate material having a water content of more than 1% by weight obtained by impregnating the particulate material with a water-containing humidity controlling agent.

14. The process as defined in claim 13 wherein the particulate material has particle size of 0.5 mm to 10 mm.

15. The process as defined in claim 13 wherein the particulate material is selected from the group consisting of diatomaceous earth, perlite, zeolite, activated alumina, silicagel, activated carbon, activated clay, sand, pebble and mixtures thereof, and has particle size of 0.5 mm to 10 mm.

16. The process as defined in claim 13 wherein the water-containing humidity controlling agent is an aqueous solution having an equilibrium humidity of more than 30%.

17. The process as defined in claim 13 wherein the water-containing humidity controlling agent is an aqueous solution of a hydrophilic organic compound having an equilibrium humidity of more than 30%.

18. The process as defined in claim 17 wherein the hydrophilic organic compound is selected from the group consisting of glycerin, ethylene glycol, sodium acetate, magnesium acetate, oxalic acid and mixtures thereof.

19. The process as defined in claim 13 wherein the water-containing humidity controlling agent is an aqueous solution of an inorganic compound having an equilibrium humidity of more than 30%.

20. The process as defined in claim 19 wherein the inorganic compound is an alkali metal or alkali earth metal halide.

21. The process as defined in claim 19 wherein the inorganic compound is selected from the group consisting of NaCl and $MgCl_2$.

22. The process as defined in claim 13 wherein the water-containing controlling agent is a saturated aqueous solution of NaCl or $MgCl_2$.

23. The process as defined in claim 13 wherein the water-containing particulate material is one obtained by impregnating the particulate material with water, followed by coating a finely divided filler on the particulate material.

* * * * *